United States Patent [19]
Wahbe et al.

[11] Patent Number: 6,151,618
[45] Date of Patent: Nov. 21, 2000

[54] SAFE GENERAL PURPOSE VIRTUAL MACHINE COMPUTING SYSTEM

[75] Inventors: Robert S. Wahbe; Steven E. Lucco; Christopher W. Fraser, all of Seattle; Vance Palmer Morrison, Kirkland, all of Wash.

[73] Assignee: Microsoft Corporation, Redmond, Wash.

[21] Appl. No.: 08/878,390

[22] Filed: Jun. 18, 1997

Related U.S. Application Data

[63] Continuation-in-part of application No. 08/566,613, Dec. 4, 1995, Pat. No. 5,761,477.

[51] Int. Cl.$^7$ .................................................. G06F 9/45
[52] U.S. Cl. ....................................... 709/1; 717/8
[58] Field of Search ................................ 395/406, 705, 395/708; 709/1; 711/145; 714/38; 717/8, 5

[56] References Cited

U.S. PATENT DOCUMENTS

| | | | |
|---|---|---|---|
| 4,667,290 | 5/1987 | Goss et al. | 364/300 |
| 5,386,557 | 1/1995 | Boykin et al. | 395/600 |
| 5,537,551 | 7/1996 | Denenberg et al. | 395/200.18 |
| 5,551,051 | 8/1996 | Silverthorn et al. | 395/800 |
| 5,586,323 | 12/1996 | Koizumi et al. | 395/705 |
| 5,590,329 | 12/1996 | Goodnow, II et al. | 395/708 |
| 5,590,331 | 12/1996 | Lewis et al. | 395/708 |
| 5,644,709 | 7/1997 | Austin | 395/185.06 |
| 5,761,477 | 6/1998 | Wahbe et al. | 395/406 |

OTHER PUBLICATIONS

R. Wahbe, et al, "Efficient Software–Based Fault Isolation", ACM publication, Dec. 1993.

S. Lucco, O. Sharp, and R. Wahbe, "Ominware: A Universal Substrate for Web Programming", Proc. of the 4$^{th}$ World Wide Web Conference, Boston, Massachusetts, Dec., 1995.

"Omniware Technical Overview", Technical Report, Colusa Software, 1995.

"Omniware: A Universal Substrate for Mobile Code", Colusa Software, 1995.

Appendix A, Colusa Software.

K. Li and P. Huda, "Memory Coherence in Shared Virtual Memory Systems", Proceedings of the 5th ACM Symposium on Principles of Distributed Computing, pp. 229–239, Aug. 1986.

C.N. Fischer and R.J. Leblanc, "The Implementation of Run–time Diagnostics in PASCAL", IEEE Transactions on Software Engineering, Jul. 1980 vol. SE–6, #4, pp. 313–319.

T. Austin, S. Breach, and G. Sohi, "Efficient Detection of All Pointer and Array Access Errors", Proceedings of the ACM Conference on Programming Language Design and Implementation, pp. 290–301, Jun. 1994.

J. Gosling, "Java Intermediate Bytecodes", ACM SIGPlan Workshop on Intermediate Representations, pp. 111–118, Jan. 1995.

"Telescript Technology: Scenes from the Electronic Marketplace", General Magic, Sunnyvale, CA, 1996.

(List continued on next page.)

*Primary Examiner*—Majid Banankhah
*Assistant Examiner*—Sue Lao
*Attorney, Agent, or Firm*—Klarquist Sparkman Campbell Leigh & Whinston, LLP

[57] ABSTRACT

A safe general purpose virtual machine computing system having a general purpose memory protection model that is hardware architecture and programming language independent. The safe general purpose virtual machine computing system is software based to facilitate operation on hardware architectures that otherwise would prevent the exchange and successful execution of mobile code programs from one computer system to another. The safe general purpose virtual machine computing system also facilitates generating Bytecode Reduced Instruction Set Computer (BRISC) compressed mobile code that can be compiled or translated into executable code very quickly in addition to being compact for transmission purposes, and that is prevented from accessing unauthorized memory locations due to Software Fault Isolation techniques implemented in the code.

38 Claims, 7 Drawing Sheets

OTHER PUBLICATIONS

R. Brooks, R. Gabriel, and G. Steele, Jr., "An Optimizing Compiler for Lexically Scoped Lisp", ACM Symposium on Lisp and Functional Programming, pp. 261–275, Aug. 1982.

D. Luckham, and N. Suzuki, "Verification of Array, Record, and Pointer Operations in PASCAL", ACM Transactions on Programming Languages and Systems, Oct. 1979, vol. 1, #2, pp. 226–244.

J. Ellis, and D. Detlefs, "Safe, Efficient Garbage Collection for C + + ", Proceedings of the USENIX C + + Conference, pp. 143–177, Apr. 1994.

E. Jul, H. Levy, N. Hutchinson, and A. Black, "Fine–Grained Mobility in the Emerald System", ACM Transactions on Computer Systems, vol. 6, #1, Feb. 1988, pp. 109–133.

P. Klint, "Interpretation Techniques", Software–Practice and Experience, Sep. 1981, vol. 11 #9, pp. 963–973.

A. Goldberg and D. Robson "Smalltalk–80: The Language and Its Implementation", Addison–Wesley, 1983, Reading, MA.

J. Davidson and J. Gresh, "Cint: A RISC Interpreter for the C Programming Language", Proceedings of the SIGPlan '87 Symposium on Interpreters and Interpretive Techniques, Jun. 1987, pp. 189–197.

L. Deutsch and A Schiffman, "Efficient Implementation of the Smalltalk–80 System", Proceedings of the 11th Annual ACM Symposium on Principles of Programming Languages, pp. 297–302, Jan. 1984.

C. Chambers, D. Ungar, and E. Lee, "An Efficient Implementation of SELF, a Dynamically–typed Object–Oriented Language Based on Prototypes", LISP and Symbolic Computation, Jul. 1991, vol. 4, #3, pp. 243–281.

C. May, "MIMIC: A Fast System/370 Simulator", Proceedings of the SIGPlan '87 Symposium on Interpreters and Interpretive Techniques, pp. 1–13, Jun. 1987.

B. Cmelik and D. Keppel, "Shade: A Fast Instruction–Set Simulator for Execution Profiling", ACM SIGMetrics Conference on Measurement and Modeling of Computer Systems, 1994, pp. 128–137, May 1994.

R. Sites, A. Chernoff, M. Kirk, M. Marks, and S. Robinson, "Binary Translation", Communications of the ACM, Feb. 1993, vol. 36, #2, pp. 69–81.

"Efficient Software–Based Fault Isolation" by Wahbe, Lucco, Anderson & Graham, Proceedings of the Symposium on Operating System Principles, Dec. 1993.

"The Evolution of Virtual Machine Architecture" by Buzen & Gagliardi, National Computer Conference, 1973.

"Survey of Virtual Machine Research" by Goldberg, Honeywell Information Systems, Waltham Massachusetts, and Harvard University, Jun. 1974.

Omniware Virtual Machine Architecture Reference Manual, Version 1.0 Beta, Microsoft Corporation, 60 pages.

Colusa Omniware Getting Started With Omniware, Colusa Software, Inc., 1995, 22 pages.

Chase, et al., Debugging with Lightweight Instrumentation, Proc. Supercomputer Debugging workshop, 1991, 8 pages.

Deutsch et al., "A Flexible Measurement Tool for Software Systems," Information Processing '71, pp. 320–326.

Kessler, Fast Breakpoints: Design and Implementation, Proc. ACM SIGPlan '90 Conference on Programming Language Design and Implementation, pp. 78–84.

Steffen, "Adding Run–Time Checking to the Portable PC Compiler," Software—Practice and Experience, vol. 22(4), Apr. 1992, pp. 305–316.

Kempton, "Run–Time Detection of Undefined Variables Considered Essential," Software—Practice and Experience, vol. 20(4), Apr. 1990, pp. 391–402.

Hastings et al., "Purify: Fast Detection of Memory Leaks and Access Errors," USENIX—Winter '92, pp. 125–136.

Johnson, "Postloading for Fun and Profit," USENIX—Winter '90, pp. 325–330.

Wall, "Systems for Late Code Modification," Digital Western Research Laboratory, Palo Alto, CA, Jun., 1991, 19 pages.

Wall, Link–Time Code Modification, Digital Western Research Laboratory, Palo Alto, CA, Sep., 1989, 17 pages.

Srivastava et al., A Practical System for Intermediate Code Optimization at Link–Time, Digital Western Research Laboratory, Palo Alto, CA, Dec., 1992, 28 pages.

Larus et al., "Rewriting Executable Files to Measure Program Behavior," University of Wisconsin Computer Sciences Technical Report 1083, Mar. 25, 1992, 17 pages.

Kendall, "Bcc: Runtime Checking for C Programs," USENIX—Summer 1983, pp. 6–16.

Sullivan et al., "Using Write Protected Data Structures to Improve Software Fault Tolerance in Highly Available Database Management Systems," Proc. $17^{th}$ Int. Conf. on Very Large Data Bases, 1991, 19 pages.

Kaufer et al., "Saber–C An Interpreter–Based Programming Environment for the C Language," USENIX—Summer '88, pp. 161–171.

Nichols, The Bug Stops Here, Electronic Design, Jan. 26, 1989, pp. 84–90.

Bedicheck, "Some Efficient Architecture Simulation Techniques," USENIX—Winter '90, pp. 53–63.

H. M. Deitel, "An Introduction to Operating Systems", 2nd Edition, Addison–Welsley Pub. Comp., pp. 703–732.

SAFE GENERAL PURPOSE VIRTUAL MACHINE COMPUTING SYSTEM

CROSS REFERENCE TO RELATED APPLICATION

This application is a Continuation-In-Part of U.S. patent application Ser. No. 08/566,613 filed Dec. 4, 1995 now U.S. Pat. No. 5,761,477, issued Jun. 2, 1998, titled "Methods For Safe and Efficient Implementations of Virtual Machines" which is hereby incorporated by reference to the same extent as if fully set forth herein.

FIELD OF THE INVENTION

The present invention relates to virtual machine implementations, and in particular to a safe general purpose virtual machine that generates optimized virtual machine computer programs that are executable in a general purpose memory protection model environment and are compact and hardware architecture and programming language independent.

PROBLEM

A virtual machine is a metaprogram more generically known as an operating system. Theoretically, the operating system environment of a virtual machine facilitates generating and/or executing virtual machine computer programs that lack hardware architecture dependencies and/or programming language dependencies. Thus, one advantage of a virtual machine is that its operational semantics remain constant from one computer program to the next regardless of the origin or operating requirements of any one computer program. However, realizing a true virtual machine computing environment among a collection of fundamentally incompatible computers, so that a single computer program will function similarly on any one of the otherwise incompatible computers, is a persistent problem in the computing field.

One key component in the operational semantics of a virtual machine is the virtual machine's memory model, otherwise known as the memory protection model. A memory model is the scheme in which a virtual machine manages its computer memory. Memory models are important because they define what memory locations in a given program space are accessible by a given computer program. Implementing a virtual machine in a manner that rigorously enforces such a memory model is considered a "safe" system that runs "safe" programs because something about the implementation prevents undesirable memory access activity by computer programs. For example, generally speaking a "safe" virtual machine is one that prevents unchecked memory access by an application program while an "unsafe" virtual machine is one that allows application program access to memory locations that are occupied by the operating system itself, thereby leaving open the potential to compromise the operating system's ability to provide an operational environment for any application program at all. Compromising the operating system itself typically results in the complete operational failure of the operating system and the application program.

Examples of virtual machine memory model types that are the basis for a "safe" virtual machine implementation include, but are not limited to, a restricted memory model and a general purpose memory model. A restricted memory model is the basis for a limited purpose virtual machine, also known as a special purpose virtual machine. A limited purpose virtual machine may in fact be "safe", however the safety is secured at the expense of a design that operates with certain types, but not all types, of hardware architectures. A limited purpose virtual machine is also considered "safe" because it is designed to operate with certain types, but not all types, of programming languages. In other words, although the limited purpose virtual machine is "safe", it is not widely available to any general purpose computing environment because the limited purpose virtual machine relies on the existence of certain hardware architectural features and/or programming language features to guarantee "safe" program operation. Absent the presence of the certain hardware and/or programming language features, the limited purpose virtual machine can not guarantee "safe" program execution and may not be able to support program execution at all.

Examples of limited purpose virtual machine implementations that rely on hardware enforcement of a memory protection model include, but are not limited to, the International Business Machines Virtual Machine/370 that is a single user virtual machine implementation, and the IVY machine that is a shared distributed memory virtual machine implementation. Both of the above limited purpose virtual machines implementations are undesirable because they require specific hardware features and/or operating system features to guarantee a "safe" program environment and such specific features do not exist in all computing environments presently in operation today.

Examples of limited purpose virtual machine implementations that rely on programming language enforcement of a memory protection model include, but are not limited to, high level syntax enforcement at compile-time as seen in Fortran and PL/I compilers, type-safe language restrictions as seen in Java by Sun Microsystems or Telescript by General Magic Corporation, eliminating support for general-purpose or global pointers as in the LISP language, implementing specialized code sequences to access shared objects as in the Emerald language, and specialized language filters or interpreters that detect undesirable program activities in interpreted programming languages and in general purpose compiled languages. However, none of the above software based techniques, whether viewed individually or in combination, directly or completely implements a safe general purpose virtual machine based on a general purpose memory protection model that is viable for use in applications such as an Internet browser. Further, each of the above techniques presents unique performance problems and/or relies on specialized hardware or operating system support that does not exist across all computing environments presently in use today.

Additional factors that make limited purpose virtual machines undesirable include delayed register allocation, and large high level byte-code transport modules. Delayed register allocation means that the virtual machine does not anticipate register usage prior to the identification of a target machine. Delayed register allocation results in delaying final conversion of a virtual machine program until the program reaches its native machine destination. This conversion delay translates into a slower response time for a user that is downloading a program from a source across a network. Large high level byte-code transport modules means that the modules are easily decompiled because they are in a byte-code format that is substantially equivalent to source code, and by definition source code is a bulky format for network transport purposes due to repetitive characters and uncompressed white space.

For these reasons, limited purpose virtual machines are undesirable in view of the specific hardware architecture and programming language dependencies, and the wide variety of alternative hardware architectures and/or programming languages that exist in present day computing environments.

A general purpose memory model is the basis for a general purpose virtual machine. The general purpose memory model defines the scope of memory location accessibility in terms of the type of program requesting the access and the permissions held by the requesting program. For example, a first computer program operating with a first permission level might have free access to a first set of memory locations while a second computer program operating with a second permission level might have unrestricted access to all memory locations. In addition, enforcing the general purpose memory model of a general purpose virtual machine allows the general purpose virtual machine to execute computer programs that originated in any standard programming language and run on any hardware architecture.

However, implementing a true general purpose virtual machine that is hardware architecture and programming language independent, remains a long standing and unattained goal in the computer industry, particularly in critical computing environments including, but not limited to, database systems, operating systems, and distributed computing. For example, a true general purpose virtual machine is desirable in distributed computing and network environments given the proliferation of Local Area Networks (LANs), Wide Area Networks (WANs), and the recent popularity of the Internet's World Wide Web (WWW) and its accompanying browsers, where users want to distribute mobile code" from one computer to the next without concern for different hardware architecture dependencies and/or programming language dependencies. A similar need exists in distributed database environments where general read/write access is required by multiple incompatible users or program fragments are stored and retrieved by multiple users having otherwise incompatible hardware architectures, operating systems, and programming language dependencies.

For the reasons stated above, there is a long felt need for a general purpose virtual machine supported by a general purpose memory protection model, that eliminates operational program dependencies on specific hardware architectures and/or programming languages, yet is efficient in terms of implementation, maintenance, and run time operation.

SOLUTION

The above identified problems are solved and an advancement made in the field by the safe general purpose virtual machine computing system of the present invention. The safe general purpose virtual machine computing system directly addresses the primary scalability factors that include the ability to generate an executable general purpose virtual machine computer program that is significantly reduced in size and free of hardware architecture and/or programming language dependencies, in addition to the ability to convert or translate from source code to native machine instructions quickly so that a general purpose virtual machine computer program can execute in a safe software based virtual machine environment that is free of hardware, programming language, and/or memory protection dependencies. More particularly, a virtual machine computer program generated pursuant to the present invention can be transmitted more transparently and quickly across a network due to the strategically compressed code, and the transmitted program can be compiled into safe efficient code faster due to the pre-allocation of registers, called explicit register allocation, at the time the program is made safe prior to transmitting the program. Further, code obscurity results from explicit register allocation and compressing the module being transmitted across the network due to the compilation process so that the virtual machine computer program in its object form is stripped of symbols and bears little resemblance to its original source code. Finally, the compactness of the compiled program is due in large part to a Bytecode Reduced Instruction set Computer (BRISC) format that uses variable length instruction operation codes to save space. BRISC variable length instructions use special instruction encodings for commonly used operation codes and combinations of operation codes to limit the overall size of the object form of a compiled virtual machine computer program.

Generating an executable general purpose virtual machine computer program includes, but is not limited to, examining the input program to determine the general safety of the program and generating a safe sequence of machine executable instructions from the foreign source program using a Software-based Fault Isolation (SFI) technique if the safe sequence has not already been generated. The SFI technique includes compiling the foreign source program into a generic virtual machine program, identifying unsafe ones of the generic virtual machine program instructions that are capable of accessing a memory address other than the memory addresses defined by the assigned memory access permission, replacing symbolic references with register references, and modifying the generic virtual machine program into a safe virtual machine program to prevent access to memory addresses other than the memory addresses defined by the assigned memory access permission. The safe virtual machine program can then be compiled and optionally compressed using BRISC instruction formats for storage in a persistent memory and/or transmitted to another computing device for execution.

Executing a general purpose virtual machine computer program in a safe virtual machine environment includes, but is not limited to, decompressing the virtual machine program, verifying that the virtual machine program is safe and free of hardware and/or programming language dependencies, and executing the virtual machine program in a general purpose memory protection model environment. The safe general purpose virtual machine computing system further includes assigning a memory access permission to a foreign source program and generating a safe sequence of machine executable instructions from the foreign source program using SFI techniques if the safe sequence has not already been generated. The safe general purpose virtual machine computing system further includes executing the safe virtual machine program within the memory addresses defined by the assigned memory access permission. Executing a safe virtual machine program within the memory addresses defined by the assigned memory access permission includes generating a program execution interrupt to trap the virtual machine program at the time the virtual machine program attempts to access a memory address other than the memory addresses defined by the assigned memory access permission. In the preferred embodiment, the safe general purpose virtual machine is implemented in the context of an Internet browser used to transfer virtual machine computer programs to and from local and remote virtual machines in the network.

An alternative embodiment of the safe general purpose virtual machine computing system includes optimizing the virtual machine program by minimizing the number of modifications required in the safe virtual machine program.

DETAILED DESCRIPTION

Figure 1:
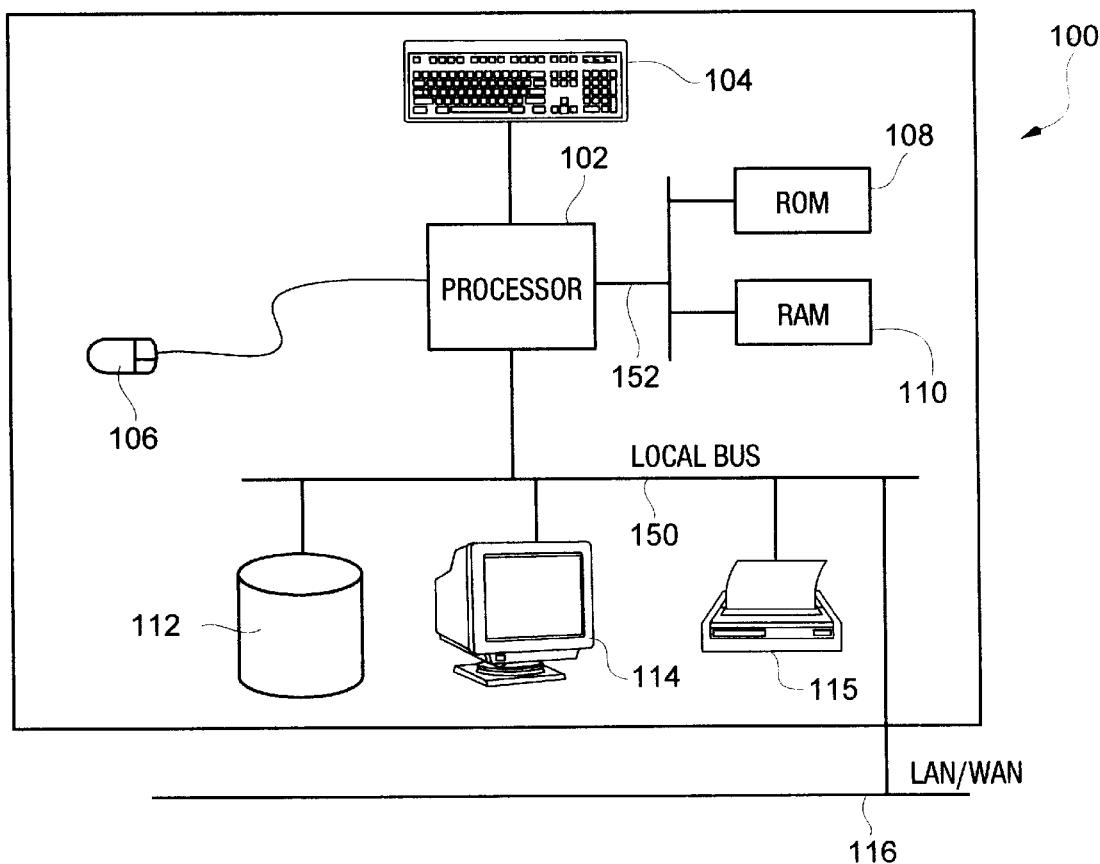
FIG. 1 illustrates an example of a general purpose computer system in block diagram form that can make use of the safe general purpose virtual machine computing environment.

Computing Environment Example—FIG. 1

FIG. 1 illustrates a block diagram hardware architecture example of a computer system 100 that can host the safe general purpose virtual machine computing system of the present invention. The computer system 100 can be used to perform inter-network or intra-network exchanging and executing of mobile code with other computer systems across a network. Appropriately translated program instructions are executable on processor 102 of computer system 100. Processor 102, also known as the Central Processing Unit (CPU), stores and/or retrieves program instructions and/or data from memory devices that include, but are not limited to, Read Only Memory (ROM) 108 and Random Access Memory (RAM) 110 by way of memory bus 152. Another accessible memory device includes non-volatile memory device 112 by way of local bus 150. User input to computer system 100 can be entered by way of keyboard 104 and/or pointing device 106. Human readable output from computer system 100 can be viewed on display 114 or in printed form on local printer 115.

More importantly for purposes of the present invention, computer system 100 is accessible from and has access to foreign nodes and other remote facilities by way of MODulator DEModulator (MODEM) 113 through public telephone or cable communication line 117, or network communication line 116 which can include, but is not limited to, a LAN or WAN communication line, an Intranet communication line, an Internet communication line, or any combination of the aforementioned. Communication lines 116 and 117 facilitate connectivity among multiple potentially diverse computer systems each having potentially incompatible computing environments with each other.

Figure 2:
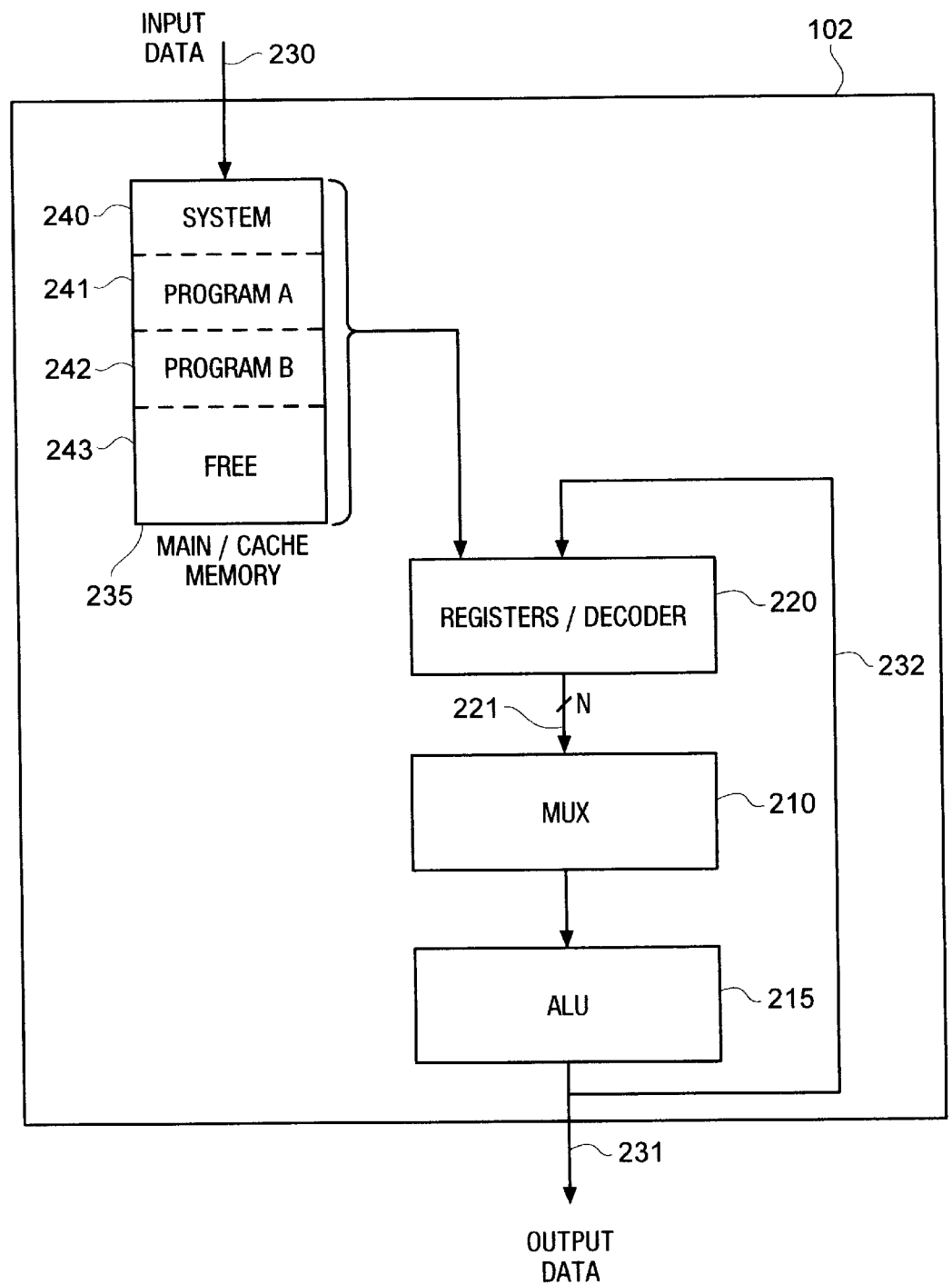
FIG. 2 illustrates a typical hardware architecture for a processor complex in block diagram form.

Hardware Architecture Example—FIG. 2

FIG. 2 illustrates a block diagram example of a hardware architecture for a processor 102. The figure is presented for discussion purposes only and is in no way intended as a limitation on the variety of specific component configurations that exist from processor to processor.

Components in processor 102 include, but are not limited to, an input data bus 230 into main and/or cache memory 235, a local processor bus 233 facilitating main/cache memory connectivity to an instruction/destination decoder and processor registers 220, a MUltipleXer (MUX) 210 having multiple selection line inputs 221 from registers/decoder 220, and an Arithmetic Logic Unit (ALU) 215 that selects and performs program operations. Output busses 231–232 from the ALU 215 distribute processed output to external and internal destinations respectively. The main/cache memory 235 is typically a Random Access type Memory (RAM) that contains the relevant portions of an operating system process 240, free memory area(s) 243, and typically a plurality of non-system processes or programs as illustrated by program A 241 and program B 242. The portions of memory 235 allocated to program A 241 and program B 242 include enough memory for the program itself and any working memory required for normal operation. Either or both program A 241 and program B 242 can be a foreign process to the extent that the process can be downloaded from another computer system from across a network.

Referring to FIGS. 1 and 2 in combination, it is important to note that absent a virtual machine implementation even with a restricted memory protection model, a computer system 100 is vulnerable to undesirable program activity. For example, a foreign program can be downloaded directly or indirectly from another computer system by way of network connection 116 into the memory 235 of processor 102. If the operating system 240 or processor architecture 102 is not compatible with the foreign program B 242 for example, then the foreign program may not be executable at all by processor 102. Alternatively for example, if foreign program B 242 is executable but is allowed to access locations in memory 235 occupied by the operating system in partition 240, then the computing environment for computer system 100 is vulnerable to an unrecoverable system error. Less catastrophic but no less undesirable failures can occur if foreign program B 242 is allowed to access locations in memory 235 occupied by another process such as process A in partition 241. Thus, there is a need for the safe general purpose virtual machine of the present invention to prevent undesirable and/or unauthorized activity by any process without appreciably affecting the overall processing performance of processor 102.

Figure 3:
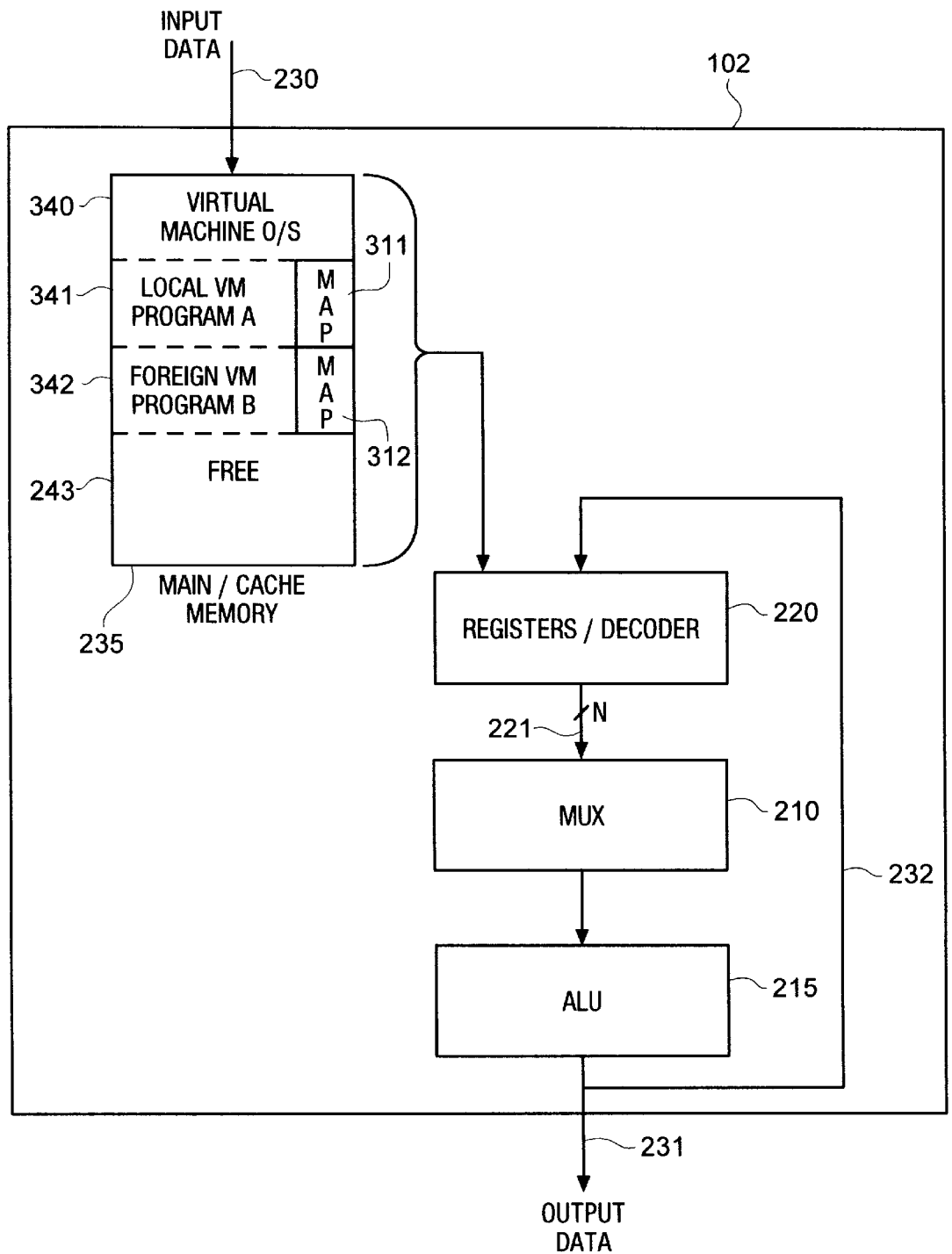
FIG. 3 illustrates a virtual machine architecture in block diagram form.

General Purpose Virtual Machine Architecture—FIG. 3

FIG. 3 illustrates a safe general purpose virtual machine in block diagram form. The architecture of the virtual machine is hardware independent so that the underlying processor 102 components including, but not limited to, input data bus 230, main/cache memory 235, registers/decoder 220, MUX 210, ALU 215, and output bus 231, are substantially similar if not identical to the processor 102 components discussed in FIG. 2. One fundamental difference between the virtual machine of FIG. 3 and the common operating system machine of FIG. 2 is that the virtual machine of FIG. 3 controls the memory access activity of processes in main/cache memory 235. The hardware components of FIGS. 2 and 3 in other respects are otherwise substantially similar.

The main/cache memory 235 in FIG. 3 includes a virtual machine control program or operating system 340, free memory space 243, a local virtual machine program 341, and a foreign virtual machine program 342. One key difference between a local virtual machine program 341 and a foreign virtual machine program 342 is that the local program was generated on the immediate machine and could be considered a "trusted" or "safe" program whereas the foreign virtual machine program originated on another computer system and for that reason is considered a "distrusted" or "unsafe" program in terms of its potential to attempt unauthorized or undesirable memory accesses beyond its own partition of main/cache memory 235. To prevent unauthorized and/or undesirable memory accesses from occurring, the safe general purpose virtual machine of the present invention imposes a memory access permission 311 and 312 for the respective processes 341 and 342, and any memory access by the respective processes 341 and 342 must conform to the general purpose memory protection model represented by the memory access permission 311 and 312. If a process accesses main/cache memory 235 in violation of its memory access permission, program instruction execution is interrupted and control is passed to a memory violation handling routine. The memory violation handling routine is part of the virtual machine control program 340 and the action taken by the handling routine can range from shutting down the violating process to merely blocking only the violating action but otherwise allowing the process to continue.

Figure 4:
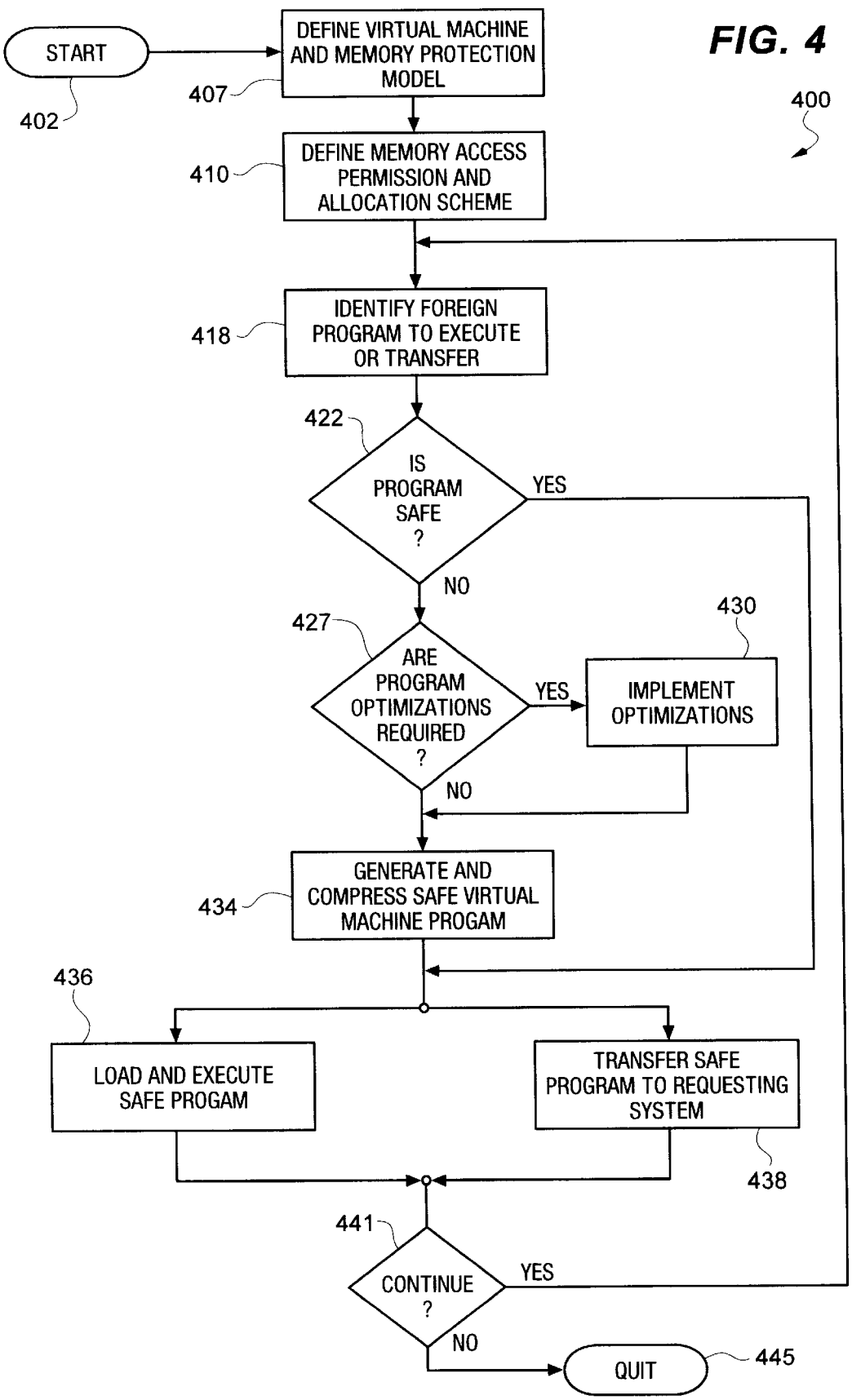
FIG. 4 illustrates an overview of operational steps for the safe general purpose virtual machine computing environment in flow diagram form.

Operational Overview—FIG. 4

FIG. 4 illustrates an overview of operational steps for the safe general purpose virtual machine 400 in flow diagram form. The operational steps begin at step 402 and proceed to defining the general purpose virtual machine and the general purpose memory model for the virtual machine at step 407. Details of step 407 are disclosed in the text section titled Virtual Machine Definition. At step 410, the Memory Access Permissions (MAP) and the MAP allocation scheme are defined. Details of step 410 are disclosed in the text section titled Memory Access Permission Definition. Once the safe general purpose virtual machine is defined, the techniques applicable to generating and executing safe virtual machine computer programs to run in the safe virtual machine environment can be addressed.

One key feature of the safe general purpose virtual machine environment is that users can give and take computer programs without concern for hardware and/or software compatibility issues. For example, the safe general purpose virtual machine environment enables a first user transferring a substantially or fully compiled safe virtual machine computer program to a second user who can execute the program. Fundamental hardware and/or programming language compatibility issues are transparent between the two users. Alternatively, the first user can transfer a high-level programming language file to the second user, and the second user can convert and compile the high-level programming language file into a safe virtual machine program that can safely be executed on the second user's hardware platform. Again, the fundamental hardware and/or programming language compatibility issues are transparent between the two users. From the perspective of either the first user or the second user, the operational steps 418–434 of FIG. 4 are substantially the same as discussed below. The level of the remaining discussion related to generating a safe virtual machine computer program, assumes that any computer program in a high-level programming language has been at least compiled to an assembly language level by either the originating foreign computing system or the destination local computing system.

Each foreign program that is received or otherwise accessed by a computer must be evaluated to determine if the program is safe to execute. It is possible that the originating foreign computing system is delivering a program that has already been made safe thus eliminating the need for the destination computer to take the processing time to make the program safe. Thus, if at decision step 422 it is determined that the foreign program is in fact safe, then processing continues at step 436 where the safe foreign program is loaded and executed on the receiving computer without further delay. Details of step 436 are disclosed in the text accompanying FIG. 8. Details of determining if a foreign program is safe to execute without further processing at decision step 422 is disclosed in the text accompanying FIG. 5.

If at decision step 422 it is determined that the foreign program is not safe to execute without further processing, then the foreign program must be made safe beginning with decision step 427. At decision step 427, if it is determined that program optimizations are necessary prior to making the foreign program safe at step 434, then processing continues to step 430. Details of step 430 are disclosed in the text accompanying FIG. 6. If it is determined at decision step 427 that optimizing the foreign program is not necessary or otherwise desirable, then processing proceeds directly to step 434 where the foreign program is compiled into a safe virtual machine program. Details of step 434 are disclosed in the text accompanying FIG. 7.

Once a safe virtual machine program is generated at step 434, the safe virtual machine program can be either loaded and executed at step 436, or transferred or otherwise made available to another user on another computing system at step 438. A safe virtual machine computer program that is made available to any other user need only be made safe once, and the program can then be marked as being a safe program by setting an internal semaphore to indicate safe or not safe for future reference. One advantage to transferring programs that have already been made safe is that receiving computers of limited computational resources can execute programs without the overhead of making the programs safe prior to execution. Such computers of limited computational resources can include, but are not limited to, a Personal Digital Assistant (PDA), a Personal Communication Service (PCS), an Internet terminal device or network computer, or a television/cable set-top box adjunct.

If at decision step 441 it is determined that additional safe virtual machine computer program processing is necessary or desired, then processing continues at step 418. Alternatively, if at decision step 441 it is determined that no additional processing is necessary or desired, then processing stops at step 445.

Virtual Machine Definition

A definition of the present invention's safe virtual machine includes, but is not limited to, a register model, instruction types overview, addressing modes, execution environment, basic assembler syntax, operating system conventions, and instruction set details. Summaries of key components of the above identified virtual machine definition categories are disclosed in the following text.

As an overall design philosophy, the safe general purpose virtual machine of the present invention is a software implemented operating system that relies on operating system enforced memory models and general addressing safety features rather than hardware architecture and/or programming language memory model enforcement and addressing safety features. One object of the safe general purpose virtual machine architecture is that it functions as the target of a safe general purpose virtual machine compiler in a similar manner as a conventional prior art compiler might target a specific hardware architecture. However, unlike computer programs compiled by traditional compilers, virtual machine computer programs compiled for the safe general purpose virtual machine of the present invention can be safely translated to native hardware instructions or other interpretive strategies can be safely implemented. The safe general purpose virtual machine instruction set is designed for easy code translations to a wide variety of hardware targets including, but not limited to, Complex Instruction Set Computer (CISC) processors such as the Intel x86 series, and Reduced Instruction Set Computer (RISC) processors such as the Digital Equipment Corporation (DEC) Alpha and the MIPS series. Although the additional instructions that are included in virtual machine programs to enforce a memory protection model by definition are additional performance overhead, even a safe virtual machine computer program that is translated to a native hardware instruction set will run at substantially similar native performance levels.

Note also that the safe general purpose machine virtual machine architecture does not include a traditional notion of a "protected operating mode" or "protection rings" because the virtual machine computer programs are executed by a host program rather than as a standalone executable. Additionally there are no privileged instructions that are forbidden to "normal" application programs and thus no privileged mode because all privileged operations are carried on outside the safe general purpose virtual machine environment.

The safe general purpose virtual machine register model is substantially similar to a conventional register model that includes one set of registers for integer values and one set of registers for floating point values. In the preferred embodiment there are 16 integer registers that are 32-bits each and 16 floating point registers that are 64-bits each.

The safe general purpose virtual machine instruction types include, but are not limited to, control transfer instructions, arithmetic instructions, bitwise manipulation instructions, register/memory instructions, and miscellaneous instructions. The control transfer type instructions are substantially similar to conventional control transfer instructions although two distinct differences exist. First, the control instructions include specific instructions that are useful to give clues to the safe general purpose virtual machine translator. Second, there are no trap type instructions to invoke a privileged or supervisory operational mode. Such privileged modes are unnecessary in the safe general purpose virtual machine because virtual machine computer programs can only execute in a user mode. All privileged operations are carried out by a trusted host application preferably such as a browser or other underlying operating system program.

The register/memory instruction types are substantially similar to conventional instructions that move data between registers and memory locations, with one exception. Load and store instructions are enhanced to allow a variety of higher level addressing modes that include, but are not limited to, symbol plus register plus offset addresses to facilitate generating efficient code on a variety of hardware target platforms.

Additional miscellaneous instruction types are included in the safe general purpose virtual machine to facilitate support for a variety of hardware target platforms. Examples of the miscellaneous instructions include, but are not limited to, a no-operation instruction, instructions that return specific hardware environment information, and register-to-memory location link and release instructions.

The program execution environment of the safe general purpose virtual machine supports only a user operation mode. In addition, two tables are available for executing program use that both contain a sequence of objects that can be safely referenced by an executing program. One table is the symbol table that contains an indexed list of resolved symbols that are available by direct reference or by a load constant value instruction (cnst). The cnst instruction takes an index value and places the address of the associated symbol into a register. Similarly, a second table called the call site table, contains a list of call sites that can be used for safe references to functions that are not defined in the presently executing program.

Finally, two key operating system conventions must be followed by assembly language programs executing on the safe general purpose virtual machine to improve code quality and to simplify the task of adding memory protection when translating a virtual machine computer program to native hardware instructions. One convention is that virtual machine computer programs should contain only executable code. Non-executable code such as data should be placed in a read/only data segment or the stack or heap. This restriction allows the operating system to better understand the control flow for purposes of effectively translating the program to native hardware instructions. The second convention is that when a static jump table is used in assembly language level programs, that the table be placed immediately after an indirect jump through a table instruction to facilitate safe jumps.

Memory Access Permission Definition

There are three types of memory access permissions that apply to a given memory address: READ, WRITE, and EXECUTE. READ and WRITE permissions carry the traditional meaning of allowing READ access to a given memory address where a READ permission exists and allowing WRITE access to a given address where WRITE permission exists. EXECUTE permission carries the meaning in the preferred embodiment, that a given memory address is accessible for the particular purpose of executing an instruction located at that address as a machine instruction. The permission table itself that contains the memory access permissions, indicates for each virtual memory address supported by the underlying native hardware whether a foreign computer program is allowed READ, WRITE, and/or EXECUTE permission for a given address.

Figure 5:
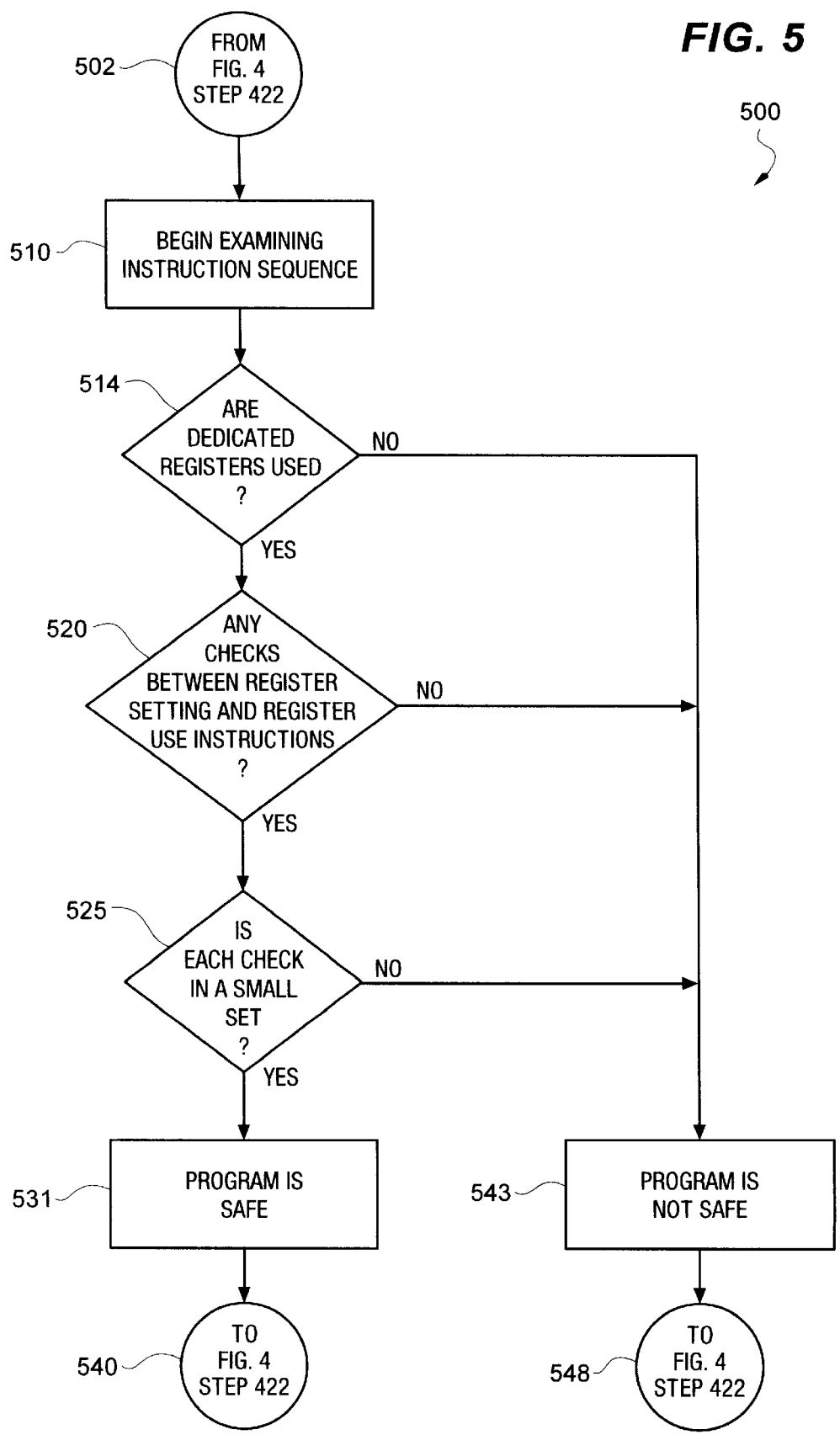
FIG. 5 illustrates the operational details in flow diagram form for determining if a program is safe.

Identifying A Safe Program—FIG. 5

FIG. 5 illustrates the operational details in flow diagram form for determining if a program is safe. The verification steps 500 begin at step 502 and are the details of decision step 422 in FIG. 4. At step 510, the foreign program is examined as a sequence of instructions to identify if three key invariants hold true. First, every use of a register is examined to determine that every unsafe instruction in the program uses a dedicated register. An example of a safe instruction for an Intel x86 instruction set, for example, might be add eax,edx where the instruction only modifies scratch memory that is part of a CPU and does not, by itself, alter permanent data in the computer's volatile or non-volatile memory. Alternatively, an unsafe instruction might be mov [eax+16],ebx where the instruction modifies the contents of volatile memory at the address eax+16 that is sixteen bytes past the contents of machine register eax. If the computer program executing the unsafe instruction does not have permission to access location eax+16, then allowing the unsafe instruction to execute can enable an untrusted computer program to complete an action that it does not have permission to perform and potentially execute subsequent instructions that are beyond the scope of the programs permission.

If at decision step 514 it is determined that an unsafe instruction does not use a dedicated register, then the program is identified as unsafe at step 543 and processing continues at step 548 as previously disclosed in FIG. 4. If at decision step 514 it is determined that each unsafe instruction does use a dedicated register, then processing continues at decision step 520.

If at decision step 520 it is determined that there is no safety check between any one instruction in the program flow that sets a register and an instruction that uses that same register, then the program is identified as unsafe at step 543 and processing continues at step 548 as previously disclosed in FIG. 4. If at decision step 520 it is determined that there is at least one safety check between each instruction in the program flow that sets a register and an instruction that uses that same register, the processing continues at decision step 525.

If at decision step 525 it is determined that each safety check in the program is not part of a small set of safety checks known to the verifying computer system, then the program is identified as unsafe at step 543 and processing continues at step 548 as previously disclosed in FIG. 4. A small set of safety checks can include, but is not limited to, scanning a set of pre-determined instruction sequences that can either: 1) convert to a legal address any address that the computer program does not have READ, WRITE, and/or EXECUTE permission to access; and/or 2) alter unsafe instructions so that they can cause a hardware exception that is catchable by a trusted host program such as a browser, if the original address that would have been used was an illegal address had the computer program remained unaltered.

If at decision step 525 it is determined that each safety check in the program is part of a small set of safety checks known to the verifying computer system, then all three invariants are satisfied and the program is identified as safe at step 543. Processing continues at step 540 as previously disclosed in FIG. 4 with the verifying computer system's knowledge that the software fault isolation safety checks are properly applied in the program being examined.

Figure 6:
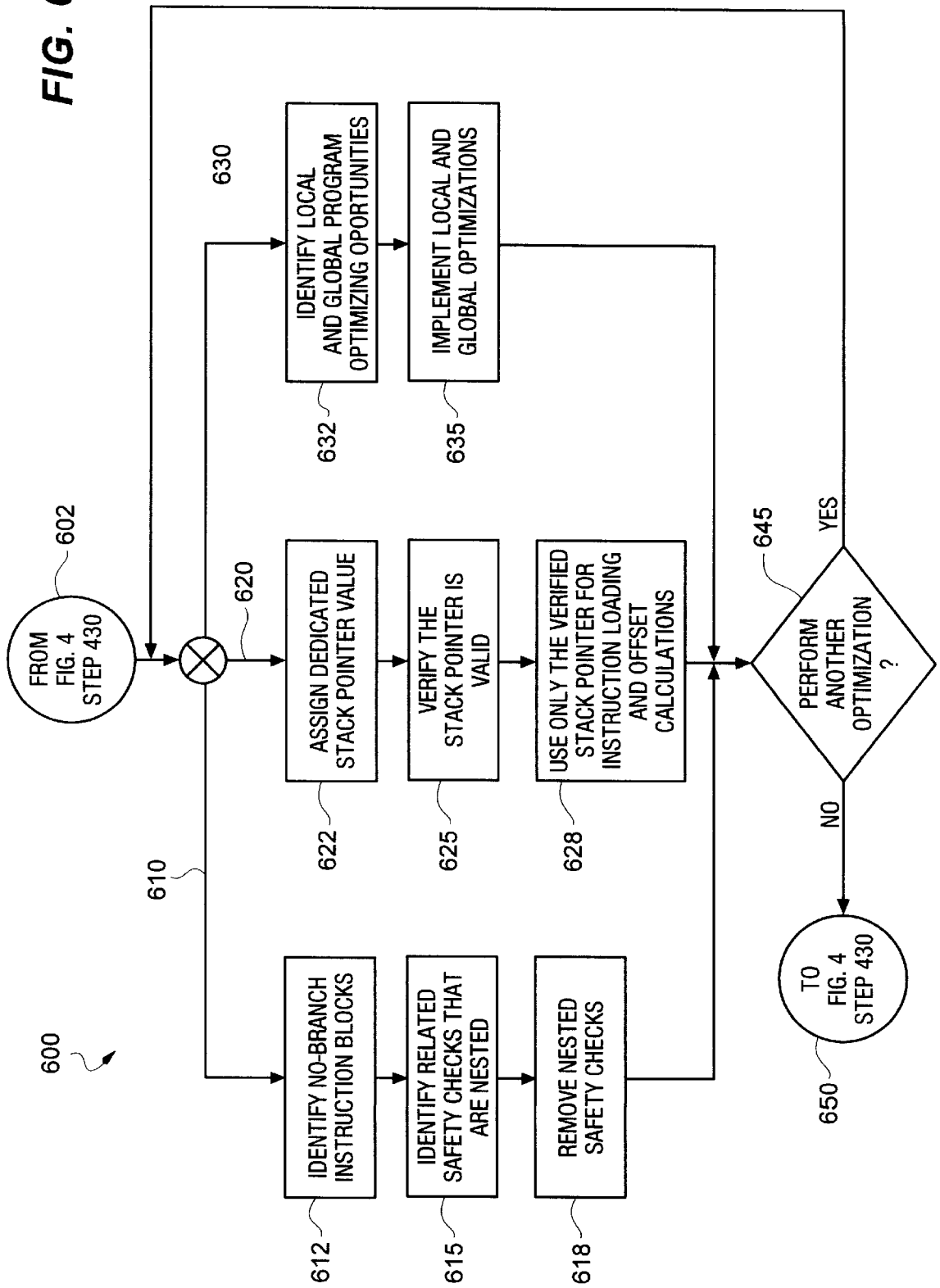
FIG. 6 illustrates the optional program optimizing operational details in flow diagram form.

Program Optimizing—FIG. 6

FIG. 6 illustrates the operational details in flow diagram form for optimizing a virtual machine program. If at decision step 427 in FIG. 4 the optional program optimizations are desired, then program optimization is enabled or otherwise implemented at step 430. Note that some optimizations occur prior to, during, and after compile time, and for this reason the optimization options are disclosed at this point in the discussion without any intent to suggest a limitation or requirement of that optimizations must occur only at a specific point in the processing.

The optimizing steps 600 in FIG. 6 are the details of step 430 in FIG. 4. Note that optimizing a program is not required and different optimization techniques can be enabled or otherwise implemented individually or in combination to achieve a satisfactory performance range for a program. Reasons why program optimization may not be desirable include, but are not limited to, too much processing overhead to optimize a program, the run time of a program is short so that optimizing offers no significant performance benefit, and the target program is not interactive or media intensive so that optimizing offers no significant performance benefit. Reasons why program optimization may be desirable include, but are not limited to, tuning a program's performance so that the program is substantially as efficient as if it were compiled for a dedicated hardware architecture even with the safety checks embedded in the program. The preferred optimization techniques include, but are not limited to, the techniques disclosed in the following text accompanying FIG. 6. Additional definitions of the terms related to safety checks and the software fault isolation technique that generates the safety checks, are disclosed in the text accompanying FIG. 7.

Program optimization selection and/or implementation begins at step 602 and proceeds with one of three techniques 610, 620, and 630 as instructed by the safe general purpose virtual machine. A first optimization technique 610 is the safety check hoisting technique that is implemented after the safety checks are inserted into the program. At step 612, the program is examined as a sequence of instructions having an operational flow, to identify blocks of instructions that do not contain decision branches. At step 615, the blocks of instructions are examined to identify safety checks that are related and nested one within the other. Two safety checks are considered related if they both are positioned in response to the setting or using of a common register. Nested safety checks are removed from the program at step 618. A performance improvement is realized by removing nested safety checks because the program has fewer instructions to execute at run time. If at decision step 645 another performance optimization is desirable, processing continues with another optimization technique at step 602. If at decision step 645 it is determined that another performance optimization is not desirable, processing continues at step 650 in the manner disclosed in FIG. 4.

A second optimization technique 620 is a dedicated stack register technique. Stack addressing is highly stylized because it usually takes the form sp+c where sp is a stack pointer that is preferably a dedicated register and c is a small positive integer. At step 622 the stack pointer sp is assigned a value and the value is verified as valid at step 625. At step 628, only the verified stack pointer is used for loading instructions and calculating static instruction offsets for the program. Using a verified static pointer that never changes results in a substantial reduction in safety checks and therefore a significant increase in program performance at run time. If at decision step 645 another performance optimization is desirable, processing continues with another optimization technique at step 602. If at decision step 645 it is determined that another performance optimization is not desirable, processing continues at step 650 in the manner disclosed in FIG. 4.

A third optimization technique 630 is a local and/or global optimization of the sequence of instructions actually generated during compile time. Local and global optimization techniques are commonly used by compilers to improve the program flow and/or performance due to specific instruction combinations, but were heretofore not used in virtual machine implementations because they require more hardware architecture specific information at compile time than a virtual machine can provide. The presence and/or incorporation of annotations results in a performance optimization, however, annotations are not a requirement for the implementation of program optimization or safety. The effect of annotations on a computer program is to give the virtual machine implementation more information about the nature of an untrusted program such as what parts of the program are intended to be executable and what parts are intended to be read-only data. The annotation information does not have to b trusted for safety implementations to work however. A virtual machine implementation can use annotation information to load and run a computer program more efficiently.

Figure 7:
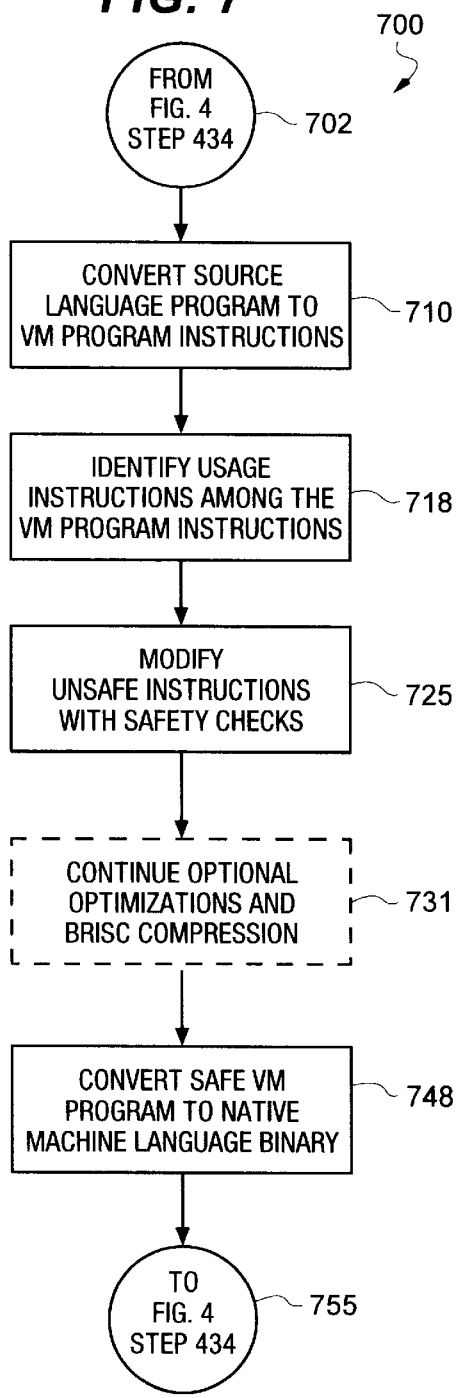
FIG. 7 illustrates the operational details for generating a safe virtual machine program in flow diagram form.

Generating A Safe Virtual Machine Program—FIG. 7

One key aspect of the safe general purpose virtual machine is that it is more than merely a system of runtime checks or sequences of machine instructions that are necessary to encapsulate an untrusted program. Instead, the safe general purpose virtual machine is a system that includes, but is not limited to, a memory management system, a compiler system, and a program loader, that each cooperatively support a memory access permission table and segregate the memory allocated and used by untrusted or otherwise unknown computer programs, so that as a whole the SFI system of the safe general purpose virtual machine supports a general memory protection model.

FIG. 7 illustrates the operational details 700 for generating a safe virtual machine program in flow diagram form. Processing begins at step 702 and proceeds to convert each line of the foreign program code into an equivalent line or sequence of general purpose virtual machine code at step 710. A general purpose virtual machine language or code is a virtual machine program representation of the original foreign program in a form resembling assembly language instructions that is hardware architecture and programming language independent. Key features of the instructions that comprise the general purpose virtual machine language is that the instruction set contains similarities to RISC instructions although they include a more complex addressing scheme. The more complex addressing scheme includes flexible memory addressing to satisfy the needs of a variety of hardware platforms, enhanced memory protection, and higher order instruction enhancements that include, but are not limited to, memory block copy instructions and bitfield instructions for direct memory access. An example of a bitfield instruction is:

bfext.uv n0,4(n1){26:3} where bfext.uv is the symbolic for a bitfield extraction operation code that extracts bits 26–28 from a word in memory located 4 bytes beyond the address in register r1, and places the extracted bits in register n0. Including bitfield instructions in the general purpose virtual machine instruction set facilitates instruction sequences that contain universally executable code that can be efficiently translated for substantially all hardware architectures. In other words, bitfield instructions facilitate the conversion of high-level programming language statements into virtual machine code by code generators, to generate endian-neutral computer programs. Bitfield instructions make it easier for compilers to output programs whose data manipulation instructions are neutral with respect to how the underlying native computer hardware chooses to lay out primitive data types such as integers and floating point numbers in volatile memory.

At step 718, unsafe instructions are identified among the virtual machine instructions generated by step 710. An unsafe instruction is one that jumps or stores to an address that can not be statically verified as being within an authorized memory segment according to the MAP. For example, control transfer instructions such as a program-counter-relative branch and store instructions using immediate addressing modes, can be statically verified. However, jumps based on the contents of a register such as upon return from a procedure, or stores that use a register to hold the target address, can not be statically verified.

Each unsafe instruction identified in step 718 is segment matched in step 725. Segment matching, also known as software encapsulation, is the process of inserting a safety check prior to each unsafe instruction. A safety check is one or more instructions that at run time determine whether the target address used by the unsafe instruction has a valid memory segment identifier prior to allowing the unsafe instruction to proceed. If the memory segment identifier is valid then the unsafe instruction is allowed to proceed. If the memory segment identifier is invalid then the program traps and control is turned over to a system error handling routine as illustrated in the text accompanying FIG. 8 steps 814–830.

Specifically, segment matching requires that four of the N registers provided by the underlying hardware architecture be reserved as dedicated registers referred to as dedicated-reg1 through dedicated-reg4. A dedicated register is used only by the inserted segment matching instructions in the following manner: 1) the target address of the unsafe instruction is moved into dedicated-reg1; 2) the memory segment identifier bits of the contents of dedicated-reg1 are right-shifted into dedicated-reg2; 3) the relevant bits of dedicated-reg2 are compared with dedicated-reg3 which contains the memory segment identifier key; and 4) trap if the comparison is not equal otherwise altered unsafe instruction uses dedicated-reg1 which contains the valid address.

Address sandboxing is an alternative to the segment matching disclosed above in that address sandboxing will further reduce run time overhead. To implement address sandboxing, safety check instructions are inserted into the virtual machine instruction sequence prior to each unsafe instruction as was done with the segment matching safety check. However, the address sandboxing safety check instructions merely set the upper bits of the target address to the correct memory segment identifier thereby forcing a valid address to exist. Address sandboxing also reduces the number of dedicated registers needed to only one by implementing the following technique: 1) the target address of the unsafe instruction is moved into dedicated-reg1 by ANDing the target address with dedicated-reg2 that contains a mask that allows the address bits to pass through but clears the memory segment identifier bits; 2) the memory segment identifier bits of dedicated-reg1 are set to the assigned memory segment identifier by Oring the dedicated-reg1 contents with dedicated-reg3 that contains the assigned memory segment identifier mask; and 3) the altered unsafe instruction uses dedicated-reg1 which contains a valid address.

Once the safety checks are inserted into the virtual machine program at step 725, additional program optimizations can optionally be implemented at step 734 as previously disclosed in the text accompanying FIG. 6. Finally, at step 748 the remaining safe and optionally optimized virtual machine program is converted from assembly language type instructions into machine level instructions. The conversion is commonly referred to as compiling and the output of the compiler is also known as the object code or binary code that is understood by the underlying hardware architecture. Additional object code size optimizations can be realized during the compile step as disclosed in the text section titled "Compiler Object Code Size Optimizations" below.

In one embodiment, the conversion or compiling of step 748 can be implemented using a template-driven strategy. A template-driven strategy is where a set of templates are defined that are each responsible for converting a particular virtual machine instruction or addressing mode into the equivalent machine code for the underlying hardware. Once an object code is produced, processing proceeds at step 755 as previously disclosed in the text accompanying FIG. 4 step 434.

Compiler Object Code Size Optimizations

When storing compiled programs or transferring compiled programs from a first computer to a second computer, the size of a compiled program can be a problem. The capacity and/or performance of transmission facilities and memory can become bottleneck problems for large compiled programs. In some scenarios it can be significantly faster or efficient to store or transmit compressed object code that can later be interpreted or decompressed and executed. This fact is self-evident when a large amount of object code is transmitted over existing MODEM speeds. This fact can also be true even with faster networks or for paging from a disk, or even for cache misses if the decompressor is fast enough. For these reasons, certain compiler optimizations can be implemented that directly target the potential bottleneck areas related to transmissions and memory.

When transmitting compiled code is the bottleneck, it is desirable to implement the best possible compression technique provided that the receiving computer's performance can afford to expand the compressed code before execution. An object module that is compressed for this purpose is called a "wire" code because the transmission facility or the "wire" is the bottleneck. When memory facilities or memory performance is the source of the bottleneck, the code must be stored and interpreted in an operationally compressed form. For purposes of this discussion, assume that the code includes jumps and calls so that random access to at least some basic blocks of code is necessary. Further, if some code must be compiled as a program is running, then the Just-In-Time (JIT) compilation rate must be very high. Finally, if both the transmission facilities and the memory facilities are bottlenecks, then one preferred embodiment is to decompress a wire code into a compressed and interpretable form.

The compression goals are to implement a compiler compression technique that suits the specialized problem of compressing virtual machine programs that can run on multiple hardware platforms, and to determine how to generate compact automata that accurately predict the next instruction operator or operand based on the present context so that commonly occurring tokens are given the shortest compression encodings. A preferred compression technique is an interpretable virtual machine compression called Byte-coded RISC (BRISC). A BRISC compression results in an object code that is substantially similar in size to non-interpretable gzipped CISC programs and supports both client-side and server-side compilation. Server-side compilation is necessary to efficiently deliver large application programs from a first computer to a second computer. For example, existing JIT compilers do not allocate registers until the native machine target is identified. However, by performing code optimization and register allocation before a program is downloaded or otherwise transferred, a pre-compiled mobile code transmission system dramatically reduces the time required to generate a final machine or object code on the native machine target.

Further, BRISC compressed code can be interpreted at or about a 12×time penalty while cutting the overall working set size of the resulting object code by over 40%. Alternately, BRISC compressed code can be compiled at over 2.5 megabytes per second to produce executable CISC-type machine code at a rate that is at least or about 100 times faster than conventional JIT compilers that are commercially available in the industry. This high compilation rate permits the recompiling of a program prior to each execution for users that have severe local disk cache constraints. In addition, the typical delivery time delay from a network or disk can mask some or even all of the recompilation time and the resulting code will run within 1.08 times of the speed of fully optimized machine code generated, for example, by the Microsoft Visual C++ 5.0 compiler. BRISC compressed code can also be used to reduce memory requirements for large desktop applications and to compress programs to fit within the memory requirements of embedded systems.

A preferred BRISC code compression implementation includes two techniques that yield a dense randomly accessible program representation. The first technique is the operand specialization and the second technique is the opcode combination. Both techniques exploit a tree compression technique, however, instead of physically separating streams of instruction information, the operand specialization and opcode combination techniques quantize the representation of the streams by packing them into a randomly accessible stream of discrete byte codes. Thus, BRISC can support just-in-time code generation, for example, at or about 2.5 MB/sec while yielding code density that is competitive with the best Lempel-Ziv (LZ) based compression programs.

The BRISC system further includes a compiler that converts high-level language programs into sequences of instructions for use in a safe general purpose virtual machine. In one preferred embodiment, the safe general purpose virtual machine includes a RISC instruction set augmented with macro-instructions for common operations such as moving and initializing blocks of data. However, the present compiling/compression system compresses fully linked executable programs containing safe general purpose virtual machine programming language instructions into programs containing BRISC instructions. A network server can then transmit the BRISC instructions across a network to client computers by way of browser programs for example, that also contain an implementation of a safe general purpose virtual machine. The safe general purpose virtual machine can either interpret the BRISC instructions directly or convert them to native machine code. In one preferred embodiment, the present compiling/compression system is operational on several platforms that include, but are not limited to, Intel x86/NT, SPARC/Solaris 2.4, PowerPC/NT, and PowerPC/MacOS. For comparison purposes only, all measurements disclosed in the present document are based on an Intel Pentium 120 Mhz processor with 32 Mbytes of memory running the Microsoft NT 4.0 workstation.

A. BRISC Generation

Because BRISC code is interpretable in the preferred embodiment, the BRISC design is constrained to ensure that instructions occur on byte boundaries. Thus, where the split-stream compression techniques described above would have used 2–3 bits per opcode, BRISC always uses even boundary 8 or 16 bits per opcode. However, BRISC makes up for the increased opcode size by packing more information into each opcode through the operand specialization and opcode combination techniques.

B. Operand Specialization

Generally speaking, operand specialization has been described as "burning in" a particular value for one or more of the fields of a patternized instruction. A more concrete description of operand specialization is disclosed below using specific examples. For example, consider the general purpose virtual machine program instruction Id.iw n0,4(sp). The operational purpose of this instruction is to load the 32-bit word at address sp+4 into register n0. The .iw suffix on this instruction indicates that this is the 32-bit integer version of the instruction. In fact, this particular instruction is one of the most frequently occurring instruction types used in benchmark programs. To investigate possible specializations of this instruction, the instruction is patternized into the following set of instructions from least general (1) to most general (8).

1. Id.iw n0,4(sp)
2. Id.iw *,4(sp)
3. Id.iw n0,4(*)
4. Id.iw n0,*(sp)
5. Id.iw *,4(*)
6. Id.iw *,*(sp)
7. Id.iw n0,*(*)
8. Id.iw *,*(*)

The most general instruction pattern (8) is part of a base instruction set. When a base instruction is written in patternized form as above, asterisks are placed in each field position of the instruction to indicate that the base instruction pattern can take on any legal field value in a given field position. For example, writing a base integer register move instruction as mov.i *,*, indicates that each of the instruction's fields can take on any value that is legal for the field's type. In the case of the mov.i *,* instruction, both of fields can take on any value from n0 through n15 in a general purpose virtual machine having 16 integer registers.

Because Id.iw n0,4(sp) was the most frequently occurring input instruction occurring in benchmarks for the present discussion, many of the specialized forms of this instruction have been added to a dictionary of possible instruction patterns. By doing so, explicitly representing common operands such as n0 and 4 are avoided. For example, when the compressor encounters instruction (1) during an input scan, instruction patterns (5)–(7) are generated in response as potential dictionary entries for commonly occurring instructions. To arrive at a two-operand-specialized instruction pattern such as Id.iw n0,4(*), the compressor first adds Id.iw n0,*(*) or Id.iw *,4(*) to the dictionary. The input program is then modified to reflect the presence of the new instruction pattern (5)–(7). On a subsequent pass over the input program, the compressor can add to the frequently occurring instruction dictionary by including a more specialized version of instruction pattern (5)–(7) by incorporating additional fields. To denote an input instruction that has been converted to use an operand-specialized instruction pattern, the instruction pattern is first enclosed in square brackets and then followed by a list of the literal values to be substituted into the unspecified fields of the instruction pattern. The unspecified fields are denoted by asterisks. For example, if instruction pattern (5) is derived from input instruction (1), then the input instruction can be rewritten as [Id.iw *,4(*)]: n0,sp.

C. Opcode Combination

The compressor also generates candidate instruction patterns through the opcode combination technique where adjacent pairs of opcodes are candidates for opcode combination. For example, if the input program contains the sequence of instructions [Id.iw n0,*(*)]:4,sp; mov.i n2,n0, the instruction pattern <[Id n0,*(*)],[mov.i ,]> becomes a candidate for addition into the base instruction set. The angled brackets in the present example denote instruction patterns that result from combining opcodes.

Because BRISC is quantized, not all instruction combinations make sense. If a combined instruction leaves a trailing sub-byte operand, the compressor can defer combining until further specialization has taken place. Deferring the combination of unspecified operands from the adjacent instructions can facilitate optimal packing of combined operands into whole numbers of bytes. The compressor generates as candidate instruction patterns not only each pair of adjacent instructions <i,j>, but every possible pair consisting of a zero or one-field operand specialization of i followed by a zero or one-field operand specialization of j. This ensures that the operand specialization technique will not compete with the opcode combination technique by further specializing an instruction before the combiner has a chance to consider a less-specialized version.

Opcode combination captures common code generation idioms. For example, data movement instructions such as Id.iw and mov.i frequently occur to set up parameters before call instructions. This is a quantized version of the tree construction done in the previous section.

D. BRISC Generation Algorithm

The compressor begins with the base instruction set, including 224 instruction patterns in the present example, and adds to the instruction set to create a dictionary of frequently occurring instruction patterns. To find useful instructions to add to the dictionary, the compressor scans the input program several times, generating candidate instruction patterns and estimating their program size reduction P and their cost in decompression memory usage working set W. The program size reduction P equals the reduction in compressed program bytes that would occur if the candidate instruction pattern were added to the dictionary minus the number of bytes needed to represent the instruction pattern in the dictionary. The decompressor for BRISC uses a table of native instruction sequences for interpretation or native code generation. For example, the compressor estimates the decompressor's memory usage cost for a given dictionary entry by averaging the size in bytes of decompression table instruction sequences for a given processor platform such as the Pentium and PowerPC 601 processor platforms. Thus, the benefit B of a given instruction pattern equals P−W. Alternatively, in abundant memory situations, B and P can be equal.

The compressor maintains a heap of candidate instructions that are sorted by B. After each pass over the input program, the compressor removes the K best candidates from the heap and adds them to the frequently occurring instruction dictionary. The compressor then modifies the input program to reflect the newly available instruction patterns by first considering each pair of instructions that can be combined by a new opcode-combined instruction pattern. On each pass, there can only be one new instruction pattern that applies to a particular pair. After the instruction combination step is complete, the compressor modifies all instructions in the input program that can be represented more compactly using one of the new instruction patterns. To avoid undue overhead in updating the input program, the compressor maintains a table that maps each base instruction pattern to a list of all input program instructions matching that pattern. Similarly, to avoid generating candidate instruction patterns that have already been generated, the compressor maintains a hash table of previously generated candidates, keyed by base instruction patterns and specialized field values.

The compressor ceases to hunt for useful instructions after a pass that doesn't yield at least K instructions for which B is positive. Thus the compressor uses a greedy algorithm for building the dictionary. The optimal algorithm would consider all possible dictionaries and their effect on compression, but this would be prohibitively time-consuming. To perform dictionary encoding, the compressor uses a order-1 semi-static Markov model so that all opcodes fit within 8 bits. In other words, both the compressor and/or decompressor can build a table for each possible instruction pattern I that enumerates the instruction patterns that can follow I in the input. If more than 256 instructions can follow I, the compressor splits I into two instruction patterns. For example, the dictionary for one preferred embodiment of the safe general purpose virtual machine that is implementing Icc, can contain 981 instruction patterns. Each instruction pattern has at most 244 instruction patterns that can follow it. There is a special context in the Markov model for basic block beginnings of various types so that the BRISC program remains interpretable. Once the compressor has created a dictionary, it outputs the dictionary followed by the modified input program that it has compressed during dictionary construction.

E. A BRISC Compression Example

The safe general purpose virtual machine compiler generates the following sequence of virtual machine program language instructions for the example program introduced in the wire format discussion above.

enter sp,sp,24
spill.i n4,16(sp)
spill.i ra,20(sp)
mov.i n4,n0
mov.i n2,n1
ble.i n4,0,$L56
mov.i n1,n4
mov.i n0,n2
call _pepper
$L56:
add.i n0,n4,−1
reload.i n4,16(sp)
reload.i ra,20(sp)
exit sp,sp,24
rjr ra For this input program, the initial dictionary is the set of base instructions including {enter, spill.i, mov.i, ble.i, call, add.i, reload.i, exit, and rjr}. Because this program is small, few opportunities exist for instruction combination or specialization. However, the program is useful to illustrate some basic steps of BRISC compression in the first three instructions of the program. Applying operand specialization to the first three instructions generates following candidate specializations in the first pass of the BRISC algorithm:

1. [enter sp,*,*]
   [enter *,sp,*]
   [enter *,*,24]
2. [spill.i n4,*(*)]
   [spill.i *,16(*)]
   [spill.i *,*(sp)]
3. [spill.i ra,*(*)]
   [spill.i *,20(*)]

Note that one candidate specialization of instruction 3, spill.i *,*(sp), has already been generated by applying operand specialization to instruction 2. For each instruction, the set of candidate instructions generated through operand specialization is called that instruction's operand-specialized set. If the corresponding base instruction pattern is added to the operand-specialized set for a given input instruction I, the augmented operand-specialized set is constructed of candidate instruction patterns for I. To apply opcode combination to instructions 1 and 2, 16 pairs of instruction patterns are generated by selecting one element from instruction 1's augmented operand-specialized set of candidates and one element from instruction 2's augmented operand-specialized set of candidates:

<[enter sp,*,*],[spill.i n4,*(*)]>
<[enter sp,*,*],[spill.i *,16(*)]>
<[enter sp,*,*],[spill.i *,*(sp)]>
<[enter *,sp,*],[spill.i n4,*(*)]>etc.

The total set of candidate instruction patterns generated by instructions 1 and 2 for the example program would be the 16 candidates generated through opcode combination and the 6 candidates generated through opcode specialization. Because the total set of base instruction patterns is only 224, however, the total number of candidates generated by a large program remains manageable.

A cost-benefit metric operation can be illustrated by application to a candidate instruction such as [enter sp,*,*]. The file size cost of a dictionary entry for [enter sp,*,*] is 2 bytes, 1 byte to indicate the base instruction, enter, 2 bits to indicate which field is specialized, and 4 bits to set the specialized value for that field. The working set cost of a dictionary entry for [enter sp,*,*] is dominated by the sequence of native instructions that will be generated by the decompressor to generate code for this instruction. For just-in-time conversion to Pentium instructions, the instruction space required is 17 bytes, and on a PowerPC 601 the instruction space requires 28 bytes. Averaging these yields W=25 for [enter sp,*,*]. This instruction pattern saves one byte over the original input program. One input instruction, [enter sp,sp,24] would be represented in 2 bytes instead of 3 bytes because the remaining field values, sp and 24, can be compacted into a single operand byte. However, the program size reduction P is the 1 byte saved minus the 2 bytes of dictionary entry. Because the overall benefit B=P−W=−26, this instruction pattern would not be added to the dictionary.

Due to the size of the present program and the code generation and/or interpretation table costs W, none of the candidate instructions are suitable so that the input program remains. For a larger input program, however, the benefits of operand specialization and opcode combination outweigh the instruction table costs. To illustrate this, an example dictionary is applied to the example program. The resulting compressed program is listed below.

<[enter__x4 sp,sp,*],[spill.i__x4 n4,*(sp)],[spill.i__x4 ra,*(sp)]>: 6,4,5
<[mov.i *,n0],[mov.i *,n1]>:n4, n2
[ble.i *,0,*]: n4, $L56
<[mov.i n1,n4],[mov.i n0,n2]>
call _pepper
$L56:
[sub__It32.I n0,*,*]:n4, 1
epi The angled brackets indicate opcode combinations. Also, if an instruction contains unspecified fields, here denoted by asterisks, the unspecified field is followed by a colon and then a list of ordered literal values that can be inserted into the unspecified fields. The__x4 suffix indicates that immediate values are multiplied by four.

The final instruction of this sequence, epi, is a special-case macro-instruction and the only such instruction used in the compressor. The semantics of the macro-instruction are to exit the current function, restore callee-saved registers, restore the frame, and return in a normal manner using the rjr instruction. All other dictionary entries are generated through either operand specialization or opcode combination. In the end, the total number of bytes in the original input program was 60 and the resulting compressed program totals 17 bytes, 7 bytes for instruction opcodes and 10 bytes for packed literals.

Figure 8:
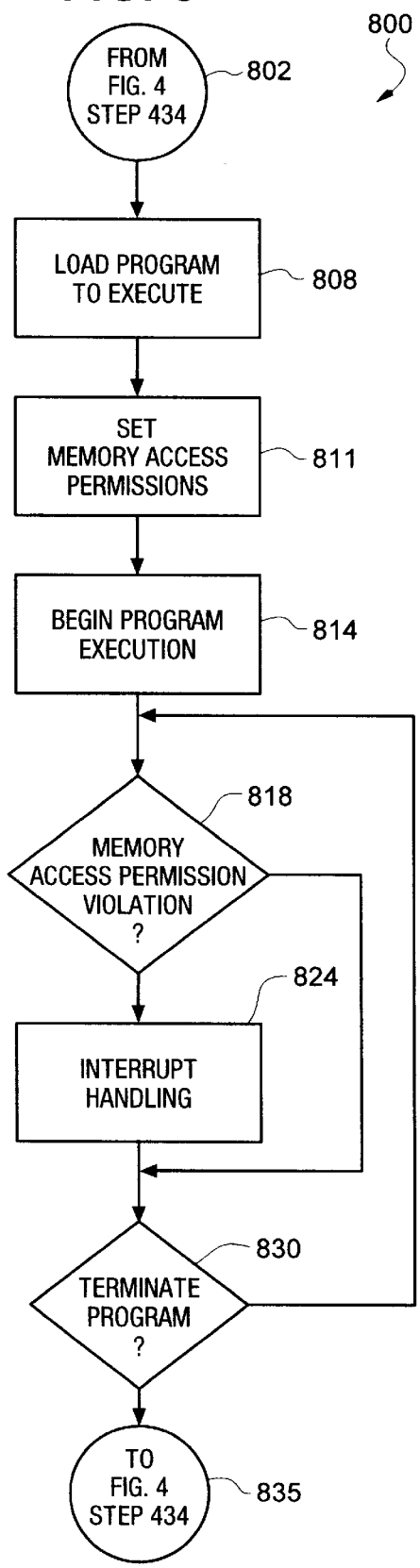
FIG. 8 illustrates the load and execute operational details for a safe virtual machine program in flow diagram form.

Program Execution—FIG. 8

FIG. 8 illustrates the load and execute operational details 800 in flow diagram form for a safe virtual machine program. The safe virtual machine loading and executing begins at step 802 and proceeds to generate and load a binary equivalent of the safe virtual machine program into memory of the client/local computer system to begin execution. The MAP for the executed program is set at step 808 as a permission table set up by the virtual machine's memory management system. Run time for the loaded virtual machine program begins at step 814 when control of the processor is turned over to the virtual machine program. If at decision step 818 it is determined that the safe virtual machine program violates the assigned MAP, then a program interrupt occurs and processing continues in an interrupt handling routine at step 824. If it is determined at decision step 818 that the safe virtual machine program has not violated the assigned MAP, then processing continues at decision step 830. At decision step 830, the program could be allowed to continue at step 818 even if a MAP violation were encountered and blocked. Alternatively, at decision step 830, the program can be terminated and processing continues at step 835 in a manner previously disclosed in FIG. 4.

Summary

The safe general purpose virtual machine computing system includes a general purpose virtual machine implementation that generates and/or verifies and executes safe virtual machine programs. Safe virtual machine programs that are stored and/or generated prior to transmission from a first virtual machine to a second virtual machine can be compressed prior to transmission to significantly reduce the size of the program being transmitted.

Although specific embodiments of the present invention are disclosed herein, it is expected that persons skilled in the art can and will design alternative safe general purpose virtual machine systems that are within the scope of the following claims either literally or under the Doctrine of Equivalents.

What is claimed is:

1. A computer readable medium containing computer executable instructions to perform a method for implementing a safe general purpose virtual machine, said method comprising:

defining said safe general purpose virtual machine having a general purpose memory protection model that does not rely or depend upon a specific hardware architecture or programming language feature for memory protection, at least one memory access permission based on said memory protection model, a bytecode reduced instruction set computer compiler wherein said bytecode reduced instructions occur only on byte boundaries, and a plurality of reduced instruction set computer virtual machine instructions selected from at least one of a group of types comprised of: control transfer instructions, arithmetic instructions, bitwise manipulation instructions, register/memory instructions, and miscellaneous instructions;

generating a safe virtual machine program from a source program that contains at least one unsafe instruction, wherein said safe virtual machine program is hardware architecture independent and programming language independent;

optionally compressing said safe virtual machine program pursuant to a bytecode reduced instruction set computer compression system, wherein said bytecode reduced instructions occur only on byte boundaries; and executing said safe virtual machine program within a memory space defined by said memory protection model and said at least one memory access permission.

2. A method according to claim 1 wherein said step of generating includes:

identifying a first set of program instructions within said source program capable of converting a legal memory address into a memory address prohibited by said memory access permissions;

identifying a second set of program instructions within said source program that are capable of jumping to a memory address prohibited by said memory access permissions;

preassigning explicit register allocations for each symbolic reference in said source program; and altering said first set of program instructions and said second set of program instructions to cause a trap catchable by a trusted program host.

3. A method according to claim 1 wherein said step of optionally compressing includes:

determining a compression benefit for said safe virtual machine program; and implementing a dense randomly accessible stream of bytecodes using a bytecode reduced instruction set computer compression on said safe virtual machine program in positive response to said step of determining.

4. A method according to claim 3 wherein said step of determining includes:

generating a list of repeated instruction patterns in said safe virtual machine program to add to an instruction dictionary;

estimating a program size reduction P to said safe virtual machine program based on a record of said list of repeated instruction patterns in said instruction dictionary;

identifying a number of bytes W required to represent said list of repeated instruction patterns in said instruction dictionary; and determining a compression benefit B based on a weighted evaluation of P and W.

5. A method according to claim 4 including:

determining said compression benefit B based on an arithmetic difference of P and W; and compressing said safe virtual machine program in response to a positive value of B.

6. A method according to claim 4 including:

compressing said safe virtual machine program in response to a positive value of P.

7. A method according to claim 4 wherein said step of implementing includes:

maintaining a heap of candidate compression instructions from said list of repeated instruction patterns;

adding distinct instruction combinations of said list of repeated instruction patterns in said heap to said instruction dictionary;

associating a unique opcode-combined instruction with each of said distinct instruction combinations; and substituting said unique opcode-combined instruction with a corresponding one of said distinct instruction combinations in said safe virtual machine program.

8. A method according to claim 7 wherein said step of maintaining includes:

hashing said heap to identify repeated ones of said list of repeated instruction patterns; and updating said instruction dictionary with only one copy of each of said distinct instruction combinations.

9. A method according to claim 1 wherein said step of optionally compressing includes:

generating operand specialization compression on repeated instruction operands within said safe virtual machine program; and generating opcode combination compression on repeated instruction patterns within said safe virtual machine program.

10. A method according to claim 9 wherein said step of generating operand specialization compression includes:

adding commonly repeated instructions to a repeated instruction dictionary; and implicitly representing repeated operands from among said commonly repeated instructions in said repeated instruction dictionary.

11. A method according to claim 9 wherein said step of generating opcode combination compression includes:

adding repeated pairs of adjacent instruction combinations to a repeated instruction dictionary;

generating a single meta-instruction for each unique one of repeated pairs of adjacent instruction combinations; and combining pairs of zero-field and one-field instructions to maximize optimal byte boundaries of densely packed instructions.

12. A method according to claim 11 wherein said step of combining pairs includes:

delaying said step of combining until a maximum number of instruction pairs are available to maximize a selection of optimal byte boundaries of densely packed instructions.

13. A method according to claim 1 wherein said step of executing includes:

verifying that said safe virtual machine program is free of unsafe instructions, hardware architecture dependencies, and programming language dependencies;

assigning a memory access permission to said safe virtual machine program;

generating a program execution interrupt to trap said safe virtual machine program at a time a memory address is accessed other than a memory address allowed by said assigned memory access permission;

generating a native machine executable program from said safe virtual machine program just-in-time to execute said native machine executable program; and executing said native machine executable program on a native machine hardware host.

14. A method according to claim 13 wherein said step of verifying includes:

identifying a safe program instruction from and unsafe program instruction within said safe virtual machine program; and generating a new safe virtual machine program in negative response to an unsafe program instruction within said safe virtual machine program.

15. A method according to claim 1 wherein said step of generating includes:

converting said source program into a sequence of virtual machine program instructions;

identifying ones of said sequence of virtual machine program instructions capable of accessing memory addresses other than said memory addresses defined by said at least one memory access permission; and modifying said virtual machine program with safety check instructions to prevent access to memory addresses other than said memory addresses defined by said at least one memory access permission, wherein said virtual machine program with modifications is said safe virtual machine program.

16. A method according to claim 15 wherein said step of modifying includes:

inserting dedicated register segment matching instructions for at least one of said sequence of virtual machine program instructions capable of accessing memory addresses other than said memory addresses defined by said at least one memory access permission.

17. A method according to claim 15 wherein said step of modifying includes:

inserting dedicated register address sandboxing instructions for at least one of said sequence of virtual machine program instructions capable of accessing memory addresses other than said memory addresses defined by said at least one memory access permission.

18. A method according to claim 1 including:

implementing run time performance enhancing optimizations on said safe virtual machine program.

19. A method according to claim 18 wherein said implementing includes:

removing related non-essential safety check instructions from said safe virtual machine program, wherein said related safety check instructions are both positioned in response to the setting or using of a common register and prevent unauthorized access to memory addresses other than said memory addresses defined by said at least one memory access permission.

20. A method according to claim 18 wherein said implementing includes:

improving said safe virtual machine program logic flow.

21. A method comprising:

defining a safe general purpose virtual machine having a general purpose memory protection model that does not rely or depend upon a specific hardware architecture or programming language feature for memory protection, at least one memory access permission based on said memory protection model, a bytecode reduced instruction set computer compiler wherein said bytecode reduced instructions occur only on byte boundaries, and a plurality of reduced instruction set computer virtual machine instructions selected from at least one of a group of types comprised of: control transfer instructions, arithmetic instructions, bitwise manipulation instructions, register/memory instructions, and miscellaneous instructions;

generating, on a first computer, a safe virtual machine program from a source program that contains at least one unsafe instruction, wherein said safe virtual machine program is hardware architecture independent and programming language independent;

optionally compressing said safe virtual machine program pursuant to a bytecode reduced instruction set computer compression system;

transferring said safe virtual machine program from said first computer to said second computer; and executing said safe virtual machine program within a memory space defined by said memory protection model and said at least one memory access permission on a second computer that is independent from and network accessible to said first computer, and said first computer is hardware architecturally distinguishable from said second computer.

22. A method according to claim 21 wherein said step of generating includes:

identifying a first set of program instructions within said source program capable of converting a legal memory address into a memory address prohibited by said memory access permissions;

identifying a second set of program instructions within said source program capable of jumping to a memory address prohibited by said memory access permissions;

preassigning explicit register allocations for each symbolic reference in said source program; and altering said first set of program instructions and said second set of program instructions to cause a trap catchable by a trusted program host on said second computer.

23. A method according to claim 21 wherein said step of executing includes:

verifying that said safe virtual machine program is free of unsafe instructions, hardware architecture dependencies, and programming language dependencies;

assigning a memory access permission to said safe virtual machine program;

generating a program execution interrupt to trap said safe virtual machine program at a time a memory address is accessed other than a memory address allowed by said assigned memory access permission;

generating a native machine executable program from said safe virtual machine program just-in-time to execute said native machine executable program; and executing said native machine executable program on native machine hardware of said second computer.

24. A method according to claim 23 including:

decompressing said safe virtual machine program.

25. A method according to claim 23 wherein said step of verifying includes:

distinguishing a safe program instruction from and unsafe program instruction within said safe virtual machine program;

generating a new safe virtual machine program in negative response to an unsafe program instruction within said safe virtual machine program.

26. A system for executing a safe virtual machine program in a safe general purpose virtual machine, said system comprising:

a first computer communicatively connected to a second computer, said first computer being operationally independent from said second computer;

means for defining a safe general purpose virtual machine having a general purpose memory protection model that does not rely or depend upon a specific hardware architecture or programming language feature for memory protection, at least one memory access permission based on said memory protection model, a bytecode reduced instruction set computer compiler wherein said bytecode reduced instructions occur only on byte boundaries, and a plurality of reduced instruction set computer virtual machine instructions selected from at least one of a group of types comprised of: control transfer instructions, arithmetic instructions, bitwise manipulation instructions, register/memory instructions, and miscellaneous instructions;

means for generating, on said first computer, a safe virtual machine program from a source program that contains at least one unsafe instruction, wherein said safe virtual machine program is hardware architecture independent and programming language independent;

means for optionally compressing said safe virtual machine program pursuant to a bytecode reduced instruction set computer compression system;

means for transferring said safe virtual machine program from said first computer to said second computer; and means for executing said safe virtual machine program within a memory space defined by said memory protection model and said at least one memory access permission on said second computer.

27. A system according to claim 26 wherein said means for generating includes:

means for identifying a first set of program instructions within said source program capable of converting a legal memory address into a memory address prohibited by said memory access permissions;

means for identifying a second set of program instructions within said source program capable of jumping to a memory address prohibited by said memory access permissions;

means for preassigning explicit register allocations for each symbolic reference in said source program; and means for altering said first set of program instructions and said second set of program instructions to cause a trap catchable by a trusted program host on said second computer.

28. A system according to claim 26 wherein said means for executing includes:

means for verifying that said safe virtual machine program is free of unsafe instructions, hardware architecture dependencies, and programming language dependencies;

means for assigning a memory access permission to said safe virtual machine program;

means for generating a program execution interrupt to trap said safe virtual machine program at a time a memory address is accessed other than a memory address allowed by said assigned memory access permission;

means for generating a native machine executable program from said safe virtual machine program just-in-time to execute said native machine executable program; and means for executing said native machine executable program on native machine hardware of said second computer.

29. A system according to claim 28 including:

means for decompressing said safe virtual machine program.

30. A system according to claim 28 wherein said means for verifying includes:

means for distinguishing a safe program instruction from and unsafe program instruction within said safe virtual machine program; and means for generating a new safe virtual machine program in negative response to an unsafe program instruction within said safe virtual machine program.

31. A computer readable medium containing computer executable instructions to perform a method for implementing a safe general purpose virtual machine, said method comprising:

defining said safe general purpose virtual machine having a general purpose memory protection model, at least one memory access permission based on said memory protection model, a bytecode reduced instruction set computer compiler, and a plurality of reduced instruction set computer virtual machine instructions comprising: non-trap type control instructions that operate only in user mode and do not invoke a privileged or supervisory mode, arithmetic instructions, bitwise manipulation instructions, register/memory instructions that include one or more load and store instructions that are enhanced to allow a variety of higher level addressing modes to facilitate generating efficient code of a variety of hardware target platforms, and miscellaneous instructions that include a no-operation instruction, one or more instructions that return specific hardware environment information, and one or more register-to-memory location link and release instructions;

generating a safe virtual machine program from a source program that contains at least one unsafe instruction, wherein said safe virtual machine program is hardware architecture independent and programming language independent;

optionally compressing said safe virtual machine program pursuant to a bytecode reduced instruction set computer compression system; and executing said safe virtual machine program within a memory space defined by said memory protection model and said at least one memory access permission.

32. A method for compressing a safe virtual machine program, which is hardware architecture independent and programming language independent, said method comprising:

generating a list of repeated instruction patterns in said safe virtual machine program to add to an instruction dictionary;

estimating a program size reduction P to said safe virtual machine program based on a record of said list of repeated instruction patterns in said instruction dictionary;

identifying a number of bytes W required to represent said list of repeated instruction patterns in said instruction dictionary;

determining a compression benefit B based on a weighted evaluation of P and W; and implementing a dense randomly accessible stream of bytecodes using a bytecode reduced instruction set computer compression on said safe virtual machine program in positive response to said step of determining, wherein said bytecode reduced instructions occur only on byte boundaries.

33. A method according to claim 32 including:

determining said compression benefit B based on an arithmetic difference of P and W; and compressing said safe virtual machine program in response to a positive value of B.

34. A method according to claim 32 including:

compressing said safe virtual machine program in response to a positive value of P.

35. A method according to claim 32 wherein said step of implementing includes:

maintaining a heap of candidate compression instructions from said list of repeated instruction patterns;

adding distinct instruction combinations of said list of repeated instruction patterns in said heap to said instruction dictionary;

associating a unique opcode-combined instruction with each of said distinct instruction combinations; and substituting said unique opcode-combined instruction with a corresponding one of said distinct instruction combinations in said safe virtual machine program.

36. A method according to claim 35 wherein said step of maintaining includes:

hashing said heap to identify repeated ones of said list of repeated instruction patterns; and updating said instruction dictionary with only one copy of each of said distinct instruction combinations.

37. A method for compressing a safe virtual machine program, which is hardware architecture independent and programming language independent, said method comprising:

generating operand specialization compression on repeated instruction operands within said safe virtual machine program including:

adding commonly repeated instructions to a repeated instruction dictionary; and implicitly representing repeated operands from among said commonly repeated instructions in said repeated instruction dictionary;

generating opcode combination compression on repeated instruction patterns within said safe virtual machine program, including:

adding repeated pairs of adjacent instruction combinations to a repeated instruction dictionary;

generating a single meta-instruction for each unique one of repeated pairs of adjacent instruction combinations; and combining pairs of zero-field and one-field instructions to maximize optimal byte boundaries of densely packed instructions.

38. A method according to claim 37 wherein said step of combining pairs includes:

delaying said step of combining until a maximum number of instruction pairs are available to maximize a selection of optimal byte boundaries of densely packed instructions.

* * * * *

UNITED STATES PATENT AND TRADEMARK OFFICE
CERTIFICATE OF CORRECTION

PATENT NO.    : 6,151,618
DATED         : November 21, 2000
INVENTOR(S)   : Wahbe It is certified that error appears in the above-identified patent and that said Letters Patent is hereby corrected as shown below:

<u>Title page,</u>
Item [56], References Cited, OTHER PUBLICATIONS, "PC" should read -- C --; and "Intermediate" should read -- Intermodule --.

Signed and Sealed this

Twenty-fourth Day of February, 2004

JON W. DUDAS
*Acting Director of the United States Patent and Trademark Office*